Jan. 19, 1965   C. T. HAYES   3,166,161
HYDRODYNAMIC TORQUE TRANSMITTING APPARATUS
Filed Sept. 5, 1961   5 Sheets-Sheet 1
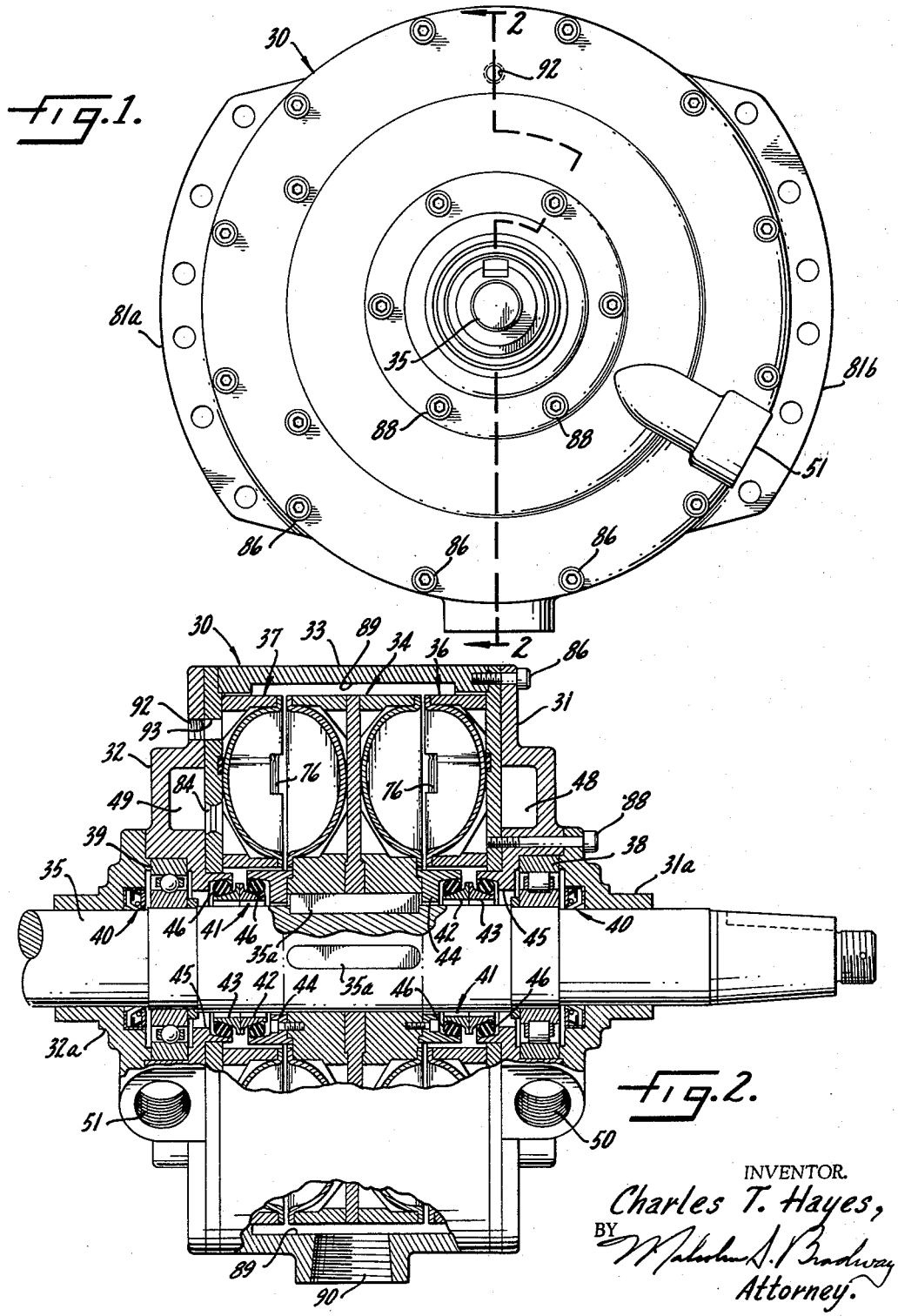
INVENTOR.
Charles T. Hayes,
BY Malcolm A. Bradway
Attorney.

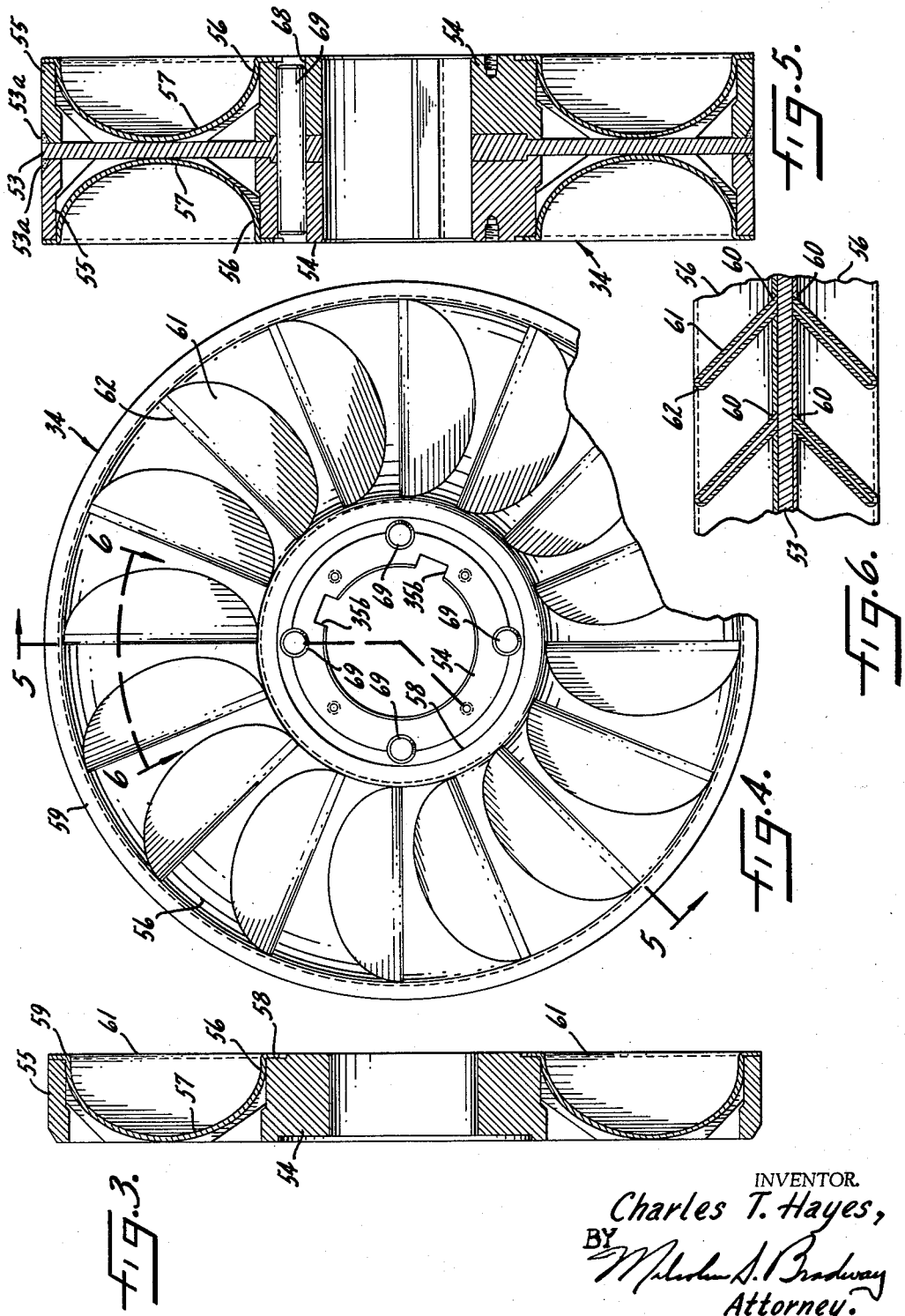

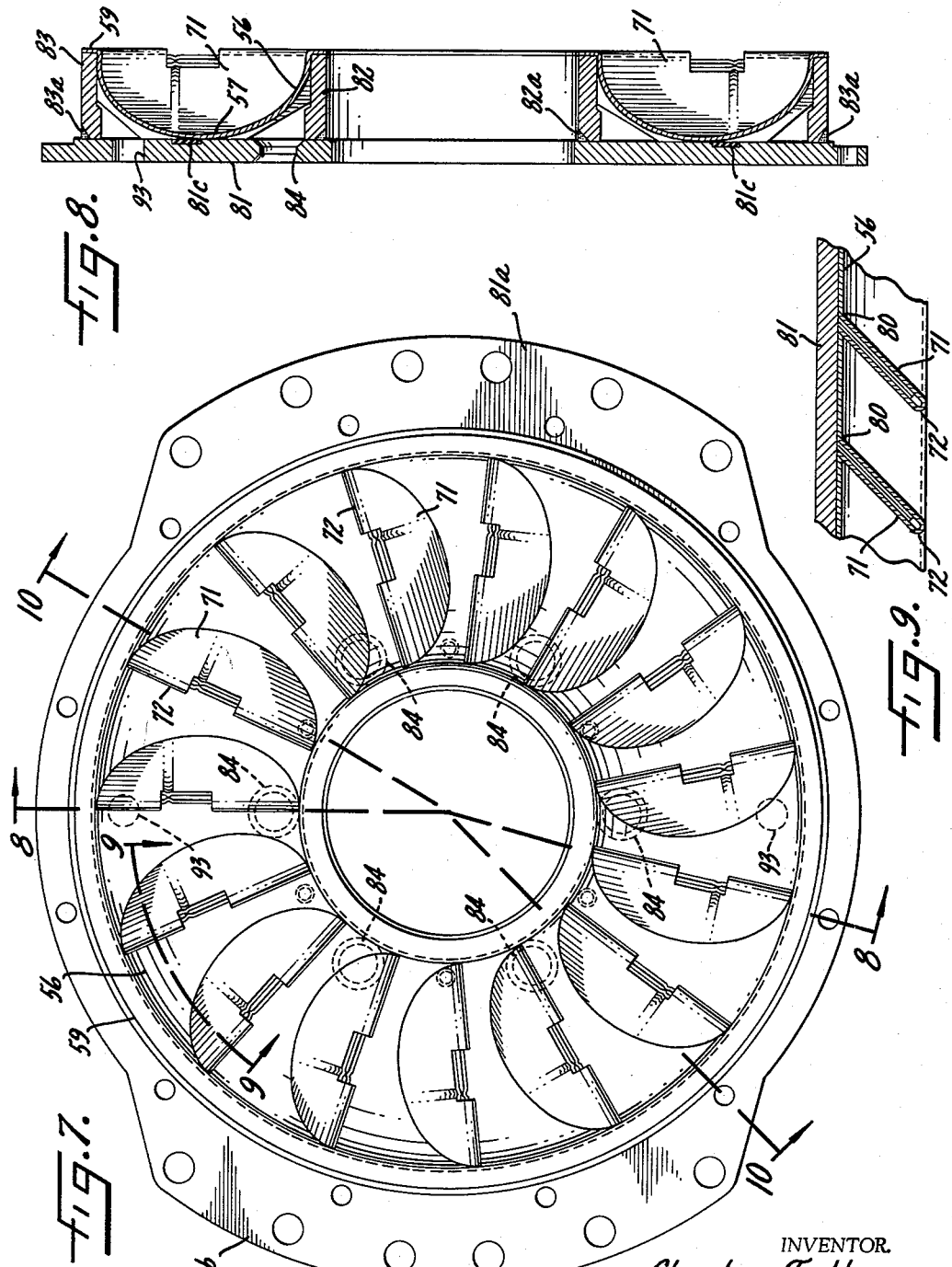

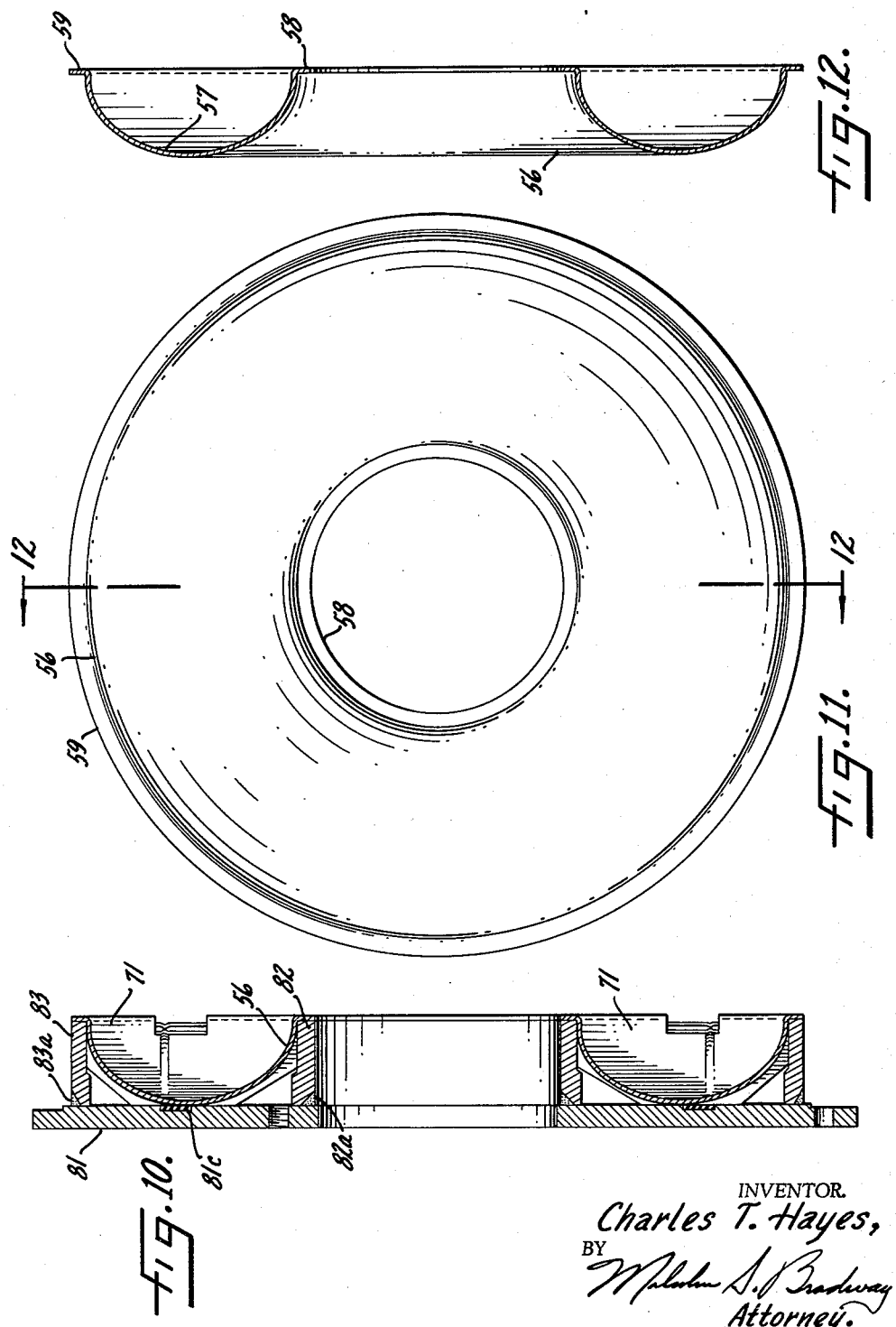

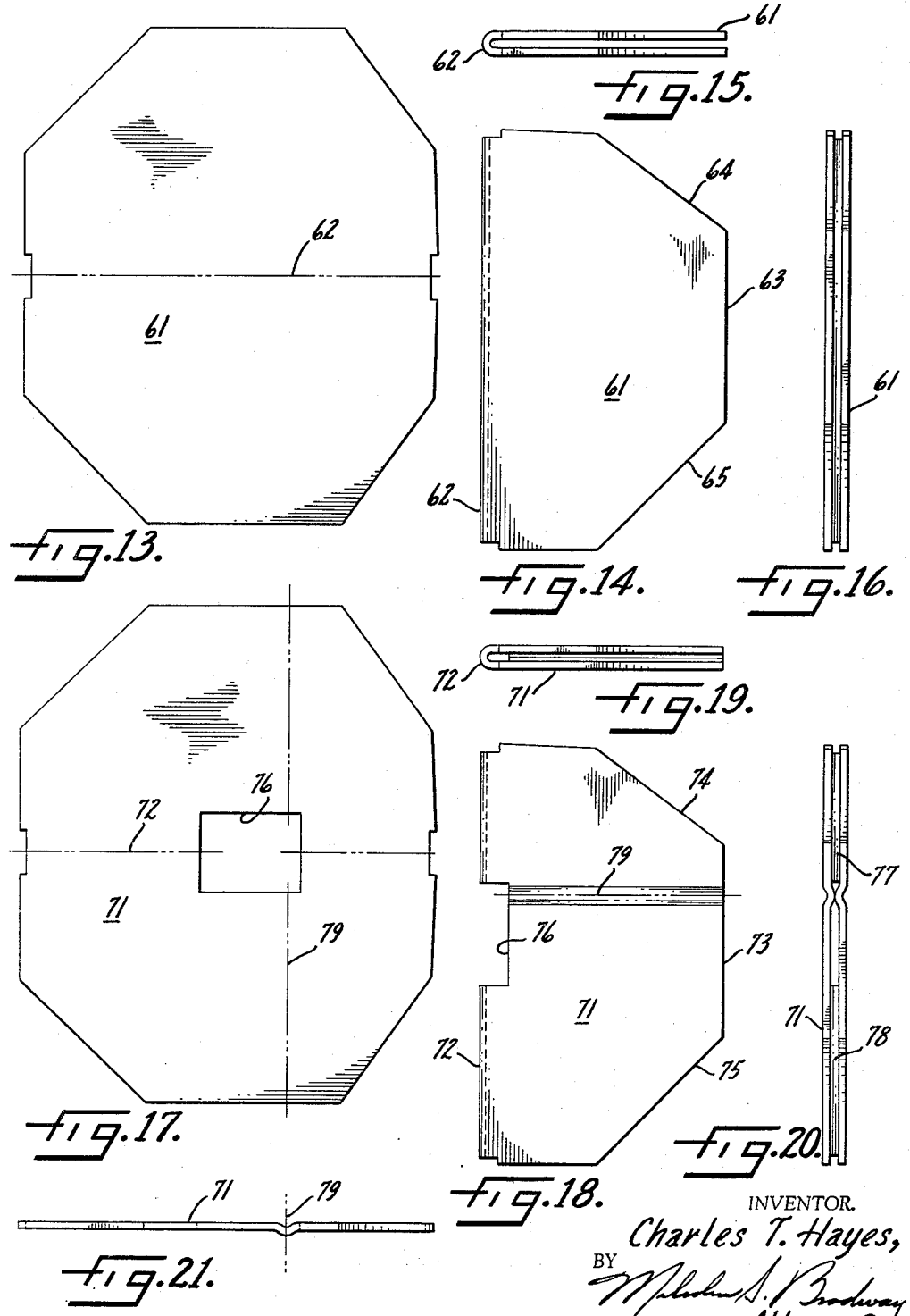

United States Patent Office 3,166,161
Patented Jan. 19, 1965

3,166,161
HYDRODYNAMIC TORQUE TRANSMITTING
APPARATUS
Charles T. Hayes, Coffeyville, Kans., assignor to
Parkersburg Rig and Reel Company
Filed Sept. 5, 1961, Ser. No. 135,860
11 Claims. (Cl. 188—90)

The present invention is directed to a new and improved hydrodynamic torque transmitting apparatus such as hydrodynamic brakes and particularly to such improvements as facilitate the manufacture thereof and which improve the operational efficiency thereof.

Devices of this general character are typified by the use of a housing having a rotor journalled for rotation therein and with a stator portion of the housing being so formed as to provide with the rotor, coacting water pockets therebetween. When water is admitted to the pockets in such a device used as a brake, braking action is obtained through the forced circulation of water through the brake, due to the impelling action of the rotor. Brakes of this general character are well known to the art.

A major purpose of the present invention is to improve systems of this general class and to increase the torque capacity of a system of a given diameter and weight, the present invention being so formed as to provide smooth flow paths for the fluid and a relatively lightweight construction.

Another purpose of the present invention is to arrange a fluid inlet to the fluid pockets so as to provide for the admission of fluid to the center of the vortices of the pockets.

Another purpose of the present invention is to so design fluid pockets that the structure of the pockets themselves provides water inlet openings and air venting openings at the vortices of the pockets.

Another purpose of the invention is to so arrange the pocket sections in the rotor and stator sections of the device as to eliminate any obstruction to the toroidal flow of fluid around the vortices of the pockets and at the same time allow for simple and inexpensive manufacture of the assembly.

Another purpose of the present invention is the creation of a simple and inexpensive method for fabricating the rotor and stator sections of a brake.

Other and further objects of the invention will be more apparent as the description proceeds, when taken with the accompanying drawings and the hereinafter appended claims, the accompanying drawings illustrating the invention as follows:

FIGURE 1 is a side elevation view of a typical brake constructed in accordance with the present invention;

FIGURE 2 is a partial cross sectional view of the brake illustrated in FIGURE 1 and taken along the section lines 2—2 of FIGURE 1;

FIGURE 3 is a sectional view of one element utilized in the formation of the brake rotor of the present invention;

FIGURE 4 is a front view of the assembled rotor of the present invention;

FIGURE 5 is a sectional illustration of the rotor illustrated in FIGURE 4, taken on the section lines of 5—5 of FIGURE 4;

FIGURE 6 is a sectional illustration of certain details of the rotor illustrated in FIGURE 4, taken on the section lines of 6—6 of FIGURE 4;

FIGURE 7 is a side elevation of one stator section of the brake;

FIGURE 8 is a sectional view of the stator element illustrated in FIGURE 7 taken on the section lines 8—8 of FIGURE 7;

FIGURE 9 is a sectional view of certain details of the stator illustrated in FIGURE 7 and taken on the section lines 9—9 of FIGURE 7;

FIGURE 10 is a sectional view of the stator illustrated in FIGURE 7, taken on the section lines of 10—10 of FIGURE 7, and illustrating certain details of the stator construction;

FIGURE 11 is a side elevation view of one element utilized in the formation of the stator illustrated in FIGURES 7 and 10 and the rotor of FIGURES 3, 4, 5 and 6;

FIGURE 12 is a sectional view of the element illustrated in FIGURE 11, taken on the section lines 12—12 of FIGURE 11;

FIGURE 13 is a plan view of one element utilized in forming vanes for the rotor pockets in the present invention;

FIGURE 14 is a side elevation of the element illustrated in FIGURE 13 and after bending of the element;

FIGURE 15 is a top view of the element seen in FIGURE 14;

FIGURE 16 is a side elevation of the element illustrated in FIGURE 14;

FIGURE 17 is a plan view of one element utilized in forming vanes for the stator pockets in the present invention;

FIGURE 18 is a side view, in elevation, of the element illustrated in FIGURE 17 and after folding of the element in FIGURE 17;

FIGURE 19 is a top view of the element illustrated in FIGURE 18;

FIGURE 20 is an end view of the element illustrated in FIGURE 18; and

FIGURE 21 is a side view of the element illustrated in FIGURE 17, prior to folding thereof.

Like elements are designated by like characters throughout the specification and drawings.

With particular reference now to the drawings and in the first instance to FIGURE 1, 30 generally designates a torque transmitting apparatus in the form of a brake. It includes a brake housing and end caps 31 and 32, which are fixed to a generally cylindrical spanning ring 33 which is positioned between the two end caps. A rotor, generally designated at 34, is fixed to a shaft 35 which is journalled for rotation in the housing. Stator portions generally designated at 36 and 37 are fixed to the inwardly facing portions of the end caps 31 and 32 and face rotor 34 for cooperation therewith.

Shaft 35 is journalled for rotation in bearing assemblies 38 and 39 which are supported by the central bearing cover plate portions 31a and 32a of the end caps 31 and 32, respectively. Outer seals 40 may be carried by the end caps and positioned outwardly of the bearings 38 and 39 so as to cooperate with inner seal assemblies 41, which are spaced inwardly of the bearings 38 and 39, in preventing the egress of fluid from the interior of the housing and preventing entry of foreign matter from the exterior of the housing to the interior of the brake.

The seals 40 may comprise packing rings carried in recesses in the central portions of the end caps in a manner well known to the art.

Each of the inner seal assemblies 41 may include a pair of relatively rotatable rings 42 and 43 which are spaced from the surface of the shaft 35. These seals also include an inner movable ring 44, which is fixed to and rotatable with the rotor and a fixed ring 45 which is carried by the central portion of the end caps. The fixed and movable rings 45 and 44, respectively, include flanges which are spaced from the rings 42 and 43 in overlying relation. Packing rings 46 are positioned between these flanges and camming surfaces on the rings 42 and 43. The arrangement is such that the pressure developed in the region of the shaft tends to force the two rings 42 and 43 tightly against one another, while forcing the packing rings 46 tightly against the surfaces of the rings 42 and 43 and against the flanges on the supporting rings 45 and 44. Other forms of inner seals may be used with the apparatus disclosed herein and the disclosure of this one form of seal should be taken as merely representative of an inner seal for the shaft.

It should be noted that each of the end caps 31 and 32 is provided with an annularly formed manifold 48 and 49, respectively, which are adapted to be supplied with fluid through inlet fittings 50 and 51, respectively. The formation of the end caps in this manner thus provides a body of fluid adjacent to the back walls of the stator portions of the brake.

In accordance with the invention, the rotors have a fabricated construction which appears most clearly in FIGURES 3 through 6 inclusive. The rotor includes an intermediate support in the form of a circular plate 53, which is adapted to extend transversely to the axis of shaft 35. The oppositely facing pocket forming sections of the rotor are defined by concentric rings 54 and 55 which support a pocket forming plate 56, which has an annularly formed depression 57 therein. Plate 56 includes flanged portions 58 and 59 which overlie the rings 54 and 55, respectively, and are fixed thereto, as by copper brazing. Plate 56 may be formed in the manner shown, by spinning a flat metal plate into the desired generally elliptical shape. As shown in the drawings, the degree of curvature at the radially inward portion of the depression, is slightly greater than and more abrupt than the degree of curvature at the radially outward portion thereof. The pocket contour for both the stator pockets and rotor pockets is made up from a plurality of radii with the arcs blended into one another to produce a theoretical optimum curvature. The cross sectional shape defined by the opposed rotor and stator pockets, as seen in FIGURE 2, is somewhat "egg shaped."

A wall of the depression 57 of plate 56 is provided with a plurality of slots 60 which are equally spaced circumferentially of the depression and which extend radially with respect to the axis of the hub ring 54. Slots 60 are formed at an angle on the order of 45° with respect to the face of the plate. These slots extend from one side of the depression to the other so that the side portions of the vanes, when inserted in the slots, are opposed to a long edge of a slot for relatively rigid support thereby.

A plurality of vanes are similarly formed as is illustrated in FIGURES 13 through 16, inclusive. Each of these vanes is defined by a metal plate 61 which is folded along a center line 62 thereof to provide a vane leading edge along the fold line. The plates 61 are so proportioned that when folded as appears in FIGURE 14, the rear edge 63 thereof is spaced from the leading edge 62 by a distance slightly greater than the width of the ring 55 (or the depth of depression 57) divided by the sine of the 45° angle. These vanes 61 are inserted into the slots 60 in the ring 57 so that their leading edges are generally coplanar with the face of the plate 56 as is seen in FIGURES 3, 5 and 6. When so positioned, the rear edges 63 are adapted to abut against the supporting plate 63. The plates or vanes 61 are inserted at an angle to the supporting ring 53 as appears in FIGURE 6 so that the vanes extend at angles on the order of 45° to the plane of the supporting plate, and with the vanes on one side of the rotor extending at angles on the order of 90° with the vanes on the other side of the rotor. The plate 61 may include cut away portions 64 and 65 at the upper lower rearward portions thereof so as to provide diagonally extending terminal lines leading to the rear edge 63. The vanes have a depth slightly greater than that necessary to extend through the rear wall of the depression so as to facilitate the brazing operation. The rear edges of the vanes are trimmed so as to flush the support 53 before the pocket subassemblies are fixed to support 53.

In fabricating the rotor section herein illustrated the plate 56 is first formed with the depression illustrated. Equally spaced slots are then cut into the wall of the depression in the positions heretofore described. A plurality of vane members of equal dimensions are then formed as shown in FIGURES 13 through 16 and inserted into the slots. The inner and outer rings 54 and 55 are then assembled with the pocket forming structure defined by the plates 56 and vanes 61. The vanes are then fixed to plate 56 and plate 56 is fixed to the rings 54 and 55 as by copper brazing in a furnace. Both right and left hand sections of the rotor are identically formed in the manner illustrated in FIGURE 3 and after two such sections are formed, they are positioned over the intermediate supporting plate 53. The inner rings of the pocket forming sections may include apertures 68 which are spaced equally about the axis of the hub. Pins 69 are then press fitted into these apertures and through correspondingly spaced apertures in the supporting plate 53, thus aligning the pocket sections and holding the pocket forming subassemblies together with the supporting ring 53. The subassemblies, as illustrated in FIGURE 3, are then welded to the supporting rings 53 as at 53a. Suitable clamping instrumentalities may be used to hold the rotor assembly illustrated in FIGURE 5 together during the welding operation.

The entire joints between the vanes 61 and the walls defining the slots 60 in the member 56 may be sealed as by the brazing operation.

After the rotor is assembled, it may be fitted onto the supporting shaft 35 and held in poistion as by means of keys 35a between the shaft 35 and the keyways 35b in the inner hub ring 54.

Before the pocket defining subassemblies of FIGURE 3 are assembled with the support plate 53, the rear edges of the vanes are trimmed so that the rear edges are flush with the rear surfaces of the rings 54 and 55.

The stator pocket sections are formed in a manner similar to the formation of the rotor pocket sections by also using the spun metal plate member 56 of FIGURE 12 and vanes inserted into radially extending slots in this member. The vanes for the stator pocket are, however, formed differently than the vanes for the rotor pockets. FIGURES 17 through 21 inclusive illustrate these vanes. In FIGURE 17, for example, a plate of metal 71 of the same outline as the vane 61 for the rotor, is folded along a center line 72 so that the fold line 72 may provide the leading edge of the vane. As is the case with the vanes 61 the rear edges of the vane 73 extend generally parallel to the leading edge 72. The vanes 71 are also cut along diagonal lines 74 and 75 at the rear portions thereof as is the case with the vanes 61 in FIGURES 13 and 14. The vanes 71, however, include a cut away portion designated at 76, which cut away portion extends on opposite sides of the fold line 72 and in the central region of the leading edge so as to provide an opening in the leading edge of the vane leading to the space between the folded portions of the vane. Means are provided for dividing this space between the folded portions of the vane into an upper space 77 and a lower space 78. This means is conveniently provided by crimping the plate 71 along the line 79 so that when the plate of FIGURE 17 is folded along the line 72 the crimp portions contact one another and provide a line of demarcation along the crimp line 79. This line is preferably located near the top of the cut away portion 76 so that the opening to the space 78 below the crimp line 79 is much larger than the opening to the space 77 above the crimp line. The space above the crimp line 79 acts as an air venting passageway leading through the opening 76 while the space below the crimp line acts as a fluid delivery passageway through the port or opening 76, in a manner to be described more fully hereinafter.

After the vanes are thus formed they are inserted in slots 80 in the spun plate element 56 forming the rear walls of the stator pockets. The slots in these elements extend along generally radial lines from the axis of the plate 56 in a fashion similar to the slots 60. The body portion of the supporting ring 81 is substantially flat. The outer periphery thereof is adapted to be clamped between the end caps 31 and 32 and the cylindrical spanning ring 33 of the housing as appears in FIGURE 2. The supporting structure 81 includes inner and outer rings 82 and 83, respectively, which are welded to plate 81, so that the depressed portion of the plate 56 fits snugly between these two cylindrical rings. The flanges 59 of the plate 56 overlie the inner faces of the rings 82 and 83 and are fixed thereto, as by copper brazing. After the vanes are inserted in the slots in plate 56, the plate 56 is positioned within the rings 82 and 83 and this assembly is copper brazed so as to fix and seal the vanes and fix plate 56 to the rings. Rubber-like joint rings 81c are then fitted in the plates 81 in position to contact the rear wall of plate 56 and seal the air space from the fluid inlet space. Plate 81 is then welded to the rings 82 and 83 as at 82a and 83a.

One or both the stator supporting rings 81 have apertured flanges 81a and 81b projecting laterally therefrom to enable mounting of the assembly. Thrust developed in the pocket sections is then transmitted directly to a support, without transmittal through the end caps. The end caps 31 and 32 may therefore have a lightweight construction.

The vanes 71 are positioned at an angle of approximately 45° to the front face of the element 56 and, when assembled in the brake, extend generally parallel to the vanes of the rotor.

It should be noted that the rear surface of the depressed portion of the plate 56 is flush with the inner surface of the supporting element 81. The rear edges of the vanes 71 are trimmed to be flush with the element 81 as appears in FIGURE 9.

The supporting element 81 has a plurality of fluid inlet apertures 84 spaced about the axis of the ring portion 82, and these apertures afford communication between the manifolds 48 and 49 and the water passage spaces between the folded portions of the vanes.

After the stator pockets of the subassemblies are assembled, as illustrated in FIGURES 8 and 10, they may be fitted over the rotor carrying shaft 35 and brought to the position illustrated in FIGURE 2. The inner seals 41 are assembled therewith, and the end caps 31 and 32 fitted over the shaft 35 with the bearings 38 and 39 and fixed to the stator supporting rings and to the spanning cylinder 33 as by means of cap screws 86.

It should be noted that the cylindrical spanning plate 33 is circumferentially recessed as at 89 to provide a water discharging space extending around the rotor and opposed to the small clearance space between the opposed faces of the stator pockets and rotor pockets. The plate 33 may include an outlet fitting 90 for discharging fluid from the brake as desired.

An uneven number of pockets may be provided in the stator and rotor so as to minimize vibration.

It should be noted that the end caps have one or more ports 92 aligned with one or more apertures 93 in the stator supporting plates 81. These ports 92 and 93 lead to the atmosphere so that the space behind the stator pockets at the radial inner extremities of these pockets are in communication with the atmosphere. The arrangement thus allows free atmospheric communication with the vortex region of the brake as through the small venting ports formed through the openings 76.

Fluid supplied through the inlets 50 and 51 readily flows into the manifolds 48 and 49 and thence may flow through the ports 84 into the spaces behind the stator pockets at the radial inner extremities of these pockets. Fluid reaches the interior of the brake pockets through the openings 76 or through the passageway 78 in the vanes.

In operation, water is supplied to the rotor and stator pockets through inlets 50 and 51 to any desired degree of pocket filling in accordance with the braking capacity desired. Water from inlets 50 and 51 flows through the manifolds 48 and 49 for passage into the space behind the stator pocket walls and from there through the space between the folded portions of the vanes and thence outwardly through the apertures 76 into the brake pockets. Water is thus admitted to the vortex region of the brake pockets.

When shaft 35 is coupled to a load and rotated, the rotor, which is coupled to the shaft, creates an impelling action on the water within the brake pockets. The water flows through a path which is generally toroidal with respect to the axis of the shaft, and may be regarded as a circulating mass with somewhat of a doughnut shape. The water in the rotor pockets is accelerated radially outwardly from the axis of shaft 35 by centrifugal force, and by reason of the curved shape of the rotor pockets, the water is then deflected towards the opposed pockets of the stator. Fluid leaves the rotor pockets near their outer edges and at a velocity which will vary with the peripheral speed of the rotor. The direction of the fluid leaving the rotor pockets is also angular with respect to the faces of the rotor pockets by reason of the inclination of the rotor vanes. Some of the fluid expelled from the rotor pockets may spill through the narrow clearance space between the opposed faces of the rotor and stator for consequent discharge through port 90, but the majority of this liquid enters the opposed stator pockets and is deflected by the curved rear walls of the stator pockets towards the axis of the brake. The velocity of the fluid decreases during its passage around the stationary pockets of the stator. This fluid emerges from the stator pockets near the inner radial limits thereof and at an angle to the opposed moving vanes of the rotor. This entry of the fluid into the rotor pockets from the stator pockets is thus directly opposed to the surfaces of the rotor vanes and this produces the braking action. As the fluid reenters the rotor pockets the fluid is again accelerated by the rotating action of the rotor before it is again discharged to the stator pockets.

The velocity of the fluid in circulation will build up to a point where the accelerating forces from the rotor may be regarded as balanced by the decelerating forces in the stator, which forces arise from skin friction and/or turbulence. The decelerating forces of the stator are held to a minimum in view of the relatively smooth and unobstructed flow through these pockets. This in turn results in greater fluid velocities for a given rotational speed of the rotor, which in turn results in greater braking capacity. By increasing this fluid velocity the braking capacity is increased.

While fluid continually escapes from the clearance space between the stator and rotor, this loss of fluid may be compensated by controlling the outlet and inlet of fluid from the brake so that the fluid entering the brake is equal to the fluid leaving the brake. In actual practice, the pockets never operate completely full of fluid. An elliptically spaced shape at the center of the vortices of the brake pockets is generally present at all times, which space is filled with air and/or vapor at atmospheric pressure. Since this space is vented to the atmosphere through the air passages in the vanes, this elliptically shaped space of air and/or vapor is of little or no consequence in terms of resisting the inflow of fluid.

The use of the particular water inlets herein shown and described are advantageous in terms of minimizing any obstruction to flow of the circulated fluid and at the same time provide a simple means for admitting either small amounts of liquid or large amounts of liquid to the brake pockets. For small amounts of pocket filling, the liquid levels in the manifolds 48 and 49 are relatively low, whereas for maximum filling, the manifolds can be filled with fluid.

The particular system for fabricating the brake is highly convenient and results in simplified, lightweight brake assemblies. In this connection both the pocket forming sections of the rotor and stator are relatively lightweight. The spun metal plates which define the rear walls of the pocket sections may be used interchangeably for the stator and rotor. Also the vanes for both stator and rotor are identically formed except for the added provisions for the water and air passages in the stator vanes. The formation of the stator and rotor in the manner described herein lends decided economies to the manufacturing process. Furthermore, the fabricated nature of these pocket forming elements results in lighter weight than cast stator and rotor elements previously used in brake constructions.

The method of construction utilized herein is highly advantageous in terms of permitting selection of different materials. For example, the spun metal plates and vanes which define the pocket members of the rotor and stator can be made of low carbon steel when the intended use of the brake does not justify or necessitate more costly material. In other conditions of use, as where corrosion or erosion become serious factors, stainless steel or high tensile bronze may be used. In other words, the material of the several parts of the assembly can be changed to suit the intended use of the apparatus, while the other elements of the apparatus can be standard parts, all of which lends economies to the manufacture of the apparatus.

It should be understood that while the assembly illustrated in the drawings and described in this specification is intended as a hydrodynamic brake, the principles of construction may be used to advantage in other forms of torque transmitting apparatus such as, for example, torque convertors.

Torque converting apparatus of the type disclosed herein gains increased capacities from the principles of the invention heretofore described. In this connection the smooth rolled surfaces of the rotor and stator pockets, which result from the metal spinning operation forming the depression for these pockets, reduces the skin friction between the pocket walls and the moving fluid therein as distinguished from the skin friction condition found in the rough cast surfaces in certain prior forms of apparatus. Sheet metal vanes are also advantageously used towards this same end and by employing the water inlet passages and air equalization passages through the bodies of the vanes themselves, the entire pocket walls are substantially smooth and unobstructed. The particular pocket shapes herein illustrated and described also contribute to the proper flow of fluid within the pockets.

Whereas I have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

I claim:

1. A stator for a hydrodynamic brake including a pocket defining plate having an annular depression formed around a central axis thereof, said plate having a series of vanes extending generally radially from said axis and positioned in said depression so as to define pockets on one side of the wall defining said depression, a supporting element positioned on one side of said plate and in sealing contact with said plate on the other side of said depression wall and along a circular line extending around said axis, means defining an annular air equalization passage on one side of said line and means defining an annular water passage on the other side of said line, some of said vanes having conduits formed therethrough and leading to each of said annular passages so as to communicate the annular passages with a generally central point at the leading edge of said vanes.

2. A torque transmitting apparatus including a stator housing having a rotor journalled for rotation therein, said housing including a plate extending transversely to the axis of rotation of said rotor, said plate having an annular depression formed about said axis and facing said rotor, said rotor including a plate with a similar depression facing said first named depression, the wall of each depression having slotted openings extending from one side of the depression to the other and generally radially from said axis, vanes positioned in said openings and fixed therein so as to define coacting fluid pockets in said plates, each vane being comprised of a folded metal member with the fold line thereof disposed adjacent the parting line between the rotor and stator faces, each member in said stator plate having a recess formed in the central region thereof and being indented along a line extending from the rear wall of the stator pockets to a wall of said recess so as to divide the space between the folded portions of said members into two spaces, and water inlet means in communication with one of said spaces and means connecting the other of said spaces to the atmosphere.

3. A hydrodynamic torque transmitting pocket-defining assembly including a pocket-defining plate having a wall defining a toroidal-like depression extending around an axis, a supporting plate extending transversely to said axis, inner and outer concentric rings fixed to said supporting plate and extending from one side thereof, said pocket-defining plate having inner and outer, radially spaced, portions fixed to said rings, and a plurality of spaced vanes fixed thereto and positioned in said depression so as to define a plurality of liquid pockets therein, said side of said supporting plate being in abutting relation to said wall on the side thereof opposite from said pockets, thereby defining annular air and liquid passages on opposite sides of the area of contact between said supporting plate and wall and bounded by said rings, supporting plate, and pocket-defining plate, some of said vanes having air and liquid passages leading from said annular passages to leading edges of said some vanes.

4. A hydrodynamic torque transmitting assembly including means defining coacting rotor and stator pockets means defining a liquid manifold and an air outlet, said stator pockets including at least one stator vane comprising a unitary metal plate having generally parallel side portions and a portion spanning said side portions while defining a vane leading edge, the side portions of said plate extending alongside one another while being spaced from one another, means extending rearwardly from the leading edge and dividing the space between said side portions into a liquid space and an air space each bounded in part by said spanning portion, said liquid space being in communication with said liquid manifold, said air space being in communication with said outlet, and an opening in said spanning portion adjacent said means and in communication both with said air space and said liquid space.

5. A hydrodynamic torque transmitting pocket-defining assembly including a pocket-defining plate having a wall defining a toroidal-like depression extending around an axis, a supporting plate extending transversely to said axis, inner and outer concentric rings fixed to said supporting plate and extending from one side thereof, said pocket-defining plate having inner and outer radially spaced portions fixed to said rings, and a plurality of spaced vanes fixed thereto and positioned in said depression so as to define a plurality of liquid pockets therein, said side of said supporting plate being in abutting relation to said wall on the side thereof opposite from said pockets, said wall having slots formed therein, said vanes having portions extending through said slots and into abutting contact with said supporting plate.

6. The structure of claim 5 wherein the contact between said supporting plate and said wall divides the space between said rings into annular air and liquid spaces, and passage means for communicating said spaces and to the area at the leading edge of some of said vanes.

7. The structure of claim 5 wherein said inner ring defines a hub portion of a rotor.

8. The structure of claim 5 wherein similar rings, pocket-defining plates and vanes are positioned on opposite sides of and are fixed to said supporting plate so as to define a rotor.

9. The structure of claim 5 wherein said supporting plate is fixed to bearing means for a rotor shaft so as to define stator pockets for a brake.

10. The structure of claim 5 wherein said vanes have leading edges generally aligned with the radially spaced portions of said pocket-defining plate and rear edges extending generally parallel to said leading edges, said rear edges being in abutting contact with said supporting plate.

11. A hydrodynamic torque transmitting assembly including means defining coacting rotor and stator pockets, means defining a liquid manifold and an air outlet, said stator pockets including at least one stator vane comprising a unitary metal plate having generally parallel side portions and a portion spanning said side portions while defining a vane leading edge, the side portions of said plate extending alongside one another while being spaced from one another, at least one side portion having an indentation in contact with the inner wall of the other side portion and extending from a point near said leading edge and rearwardly therefrom to thereby divide the space between said side portions into a liquid space and an air space each bounded in part by said spanning portion, said liquid space being in communication with said liquid manifold, said air space being in communication with said outlet, and an opening in said spanning portion adjacent said indentation and in communication both with said air space and said liquid space.

References Cited in the file of this patent

UNITED STATES PATENTS

| | | |
|---|---|---|
| 2,157,441 | Sullivan | May 9, 1939 |
| 2,226,412 | Schmidt | Dec. 12, 1940 |
| 2,335,091 | Utz | Nov. 23, 1943 |
| 2,341,122 | Schmidt | Feb. 8, 1944 |
| 2,350,933 | Schmidt | June 6, 1944 |
| 2,358,469 | Neracher | Sept. 19, 1944 |
| 2,496,179 | Schwarz | Jan. 31, 1950 |
| 2,696,660 | Misch | Dec. 14, 1954 |
| 2,733,778 | Mater et al. | Feb. 7, 1956 |
| 2,768,711 | Cline | Oct. 30, 1956 |

FOREIGN PATENTS

| | | |
|---|---|---|
| 24,949 | Great Britain | of 1910 |
| 608,432 | Great Britain | Sept. 16, 1948 |